Patented Oct. 20, 1925.

1,558,172

UNITED STATES PATENT OFFICE.

THEODOR JOSEPH AZON JACOMETTI, OF AMSTERDAM, NETHERLANDS, ASSIGNOR TO NEDERLANDSCH-INDISCHE SPIRITUS MAATSCHAPPIJ, OF AMSTERDAM, NETHERLANDS.

METHOD OF RENDERING ROADS DUST FREE.

No Drawing.     Application filed June 2, 1925.  Serial No. 34,468.

*To all whom it may concern:*

Be it known that I, THEODOR JOSEPH AZON JACOMETTI, a subject of the Netherlands, and residing at 10 Sarphatikade, Amsterdam, Netherlands, have invented a certain new and useful Improved Method of Rendering Roads Dust Free, of which the following is a specification.

For rendering roads dust-free hygroscopic substances or liquids containing hygroscopic substances are frequently used. Among these substances may be mentioned hygroscopic salts, such as sodium chloride, calcium chloride and the like, and many organic substances, such as various kinds of sugar. For this purpose in British Patent 17,952/1914 the use of molasses is recommended, which substance is in addition previously mixed with inorganic salts for increasing the hygroscopic action.

The invention has for its object to provide means for rendering roads dust-free and consists in this, that the roads are treated with the residual liquid from the manufacture of alcohol.

This liquid is the residue left after the alcohol and the fusel oil has been obtained by distillation from the fermented wort.

It has been found, that molasses contains besides the fermentable kinds of sugar other hygroscopic substances, which in the manufacture of alcohol are not removed from the molasses to be fermented, but pass entirely into the residual liquid.

The hygroscopic character enhances the dust-binding properties of the residual liquid, which, to judge from samples, possesses excellent properties for rendering roads dust-free.

The useful effect is shown by the residual liquid retaining the water for a very long time, binding the dust and, during moist weather, absorbing water again very soon and to a considerable degree.

As regards the use of molasses and the like, the use of the residual liquid referred to has the advantage, that the fermentable kinds of sugar are no longer present, so that fermentation in that way is no longer possible, and that the loosening of the material forming the road by the gases given off during fermentation is prevented.

As compared with known methods, for instance the spraying of the road with dust-binding materials, such as tar, crude petroleum or crude oil, the method according to the present invention has the advantage of being far less costly and also of being applicable to paved roads.

What I claim is:—

1. A method of rendering roads dust-free, consisting in treating the roads with the residual liquid from the distillation of alcohol, as set forth.

2. A method of rendering roads dust-free, consisting in treating the roads with the waste product from the manufacture of alcohol from molasses, as set forth.

In testimony whereof I have signed my name to this specification.

THEODOR JOSEPH AZON JACOMETTI.